Patented Dec. 30, 1941

2,267,741

UNITED STATES PATENT OFFICE 2,267,741

DIAMINO-1.4-BENZOQUINONES

Gerhard Langbein, Hofheim in Taunus, Germany, assignor to General Aniline & Film Corporation, a corporation of Delaware No Drawing. Application November 29, 1938, Serial No. 242,919. In Germany December 4, 1937

7 Claims. (Cl. 260—315)

The present invention relates to diamino-1.4-benzoquinones and derivatives thereof and to a process of preparing them.

I have found that 2.5-diamino-1.4-benzoquinones and derivatives thereof are obtainable by condensing with ammonia or a primary amine a benzoquinone compound corresponding with the following general formula:

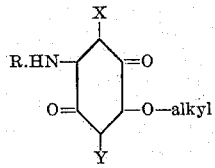

wherein X and Y represent members of the group consisting of hydrogen, halogen and methyl and R represents a member of the group consisting of hydrogen, alkyl and aryl, and obtainable by the process of U. S. Patent No. 2,229,099 (patent application Ser. No. 242,918, filed November 29, 1938 for "Amino-alkoxy-1.4-benzoquinones and derivatives thereof and a process of preparing them" filed in the name of Gerhard Langbein). The condensation is preferably performed by heating the components in a diluent, such as an organic solvent and, if desired, in the presence of an acid-binding agent. The amine used for the condensation may also be present in excess and may then serve both as a diluent and as an acid-binding agent.

The primary amines used for the condensation may be of various kinds. There may be used alkyl-amines, such as for instance methyl-, ethyl-, butyl-amine and the like, or any aryl-amines containing in the aryl nucleus any desired substituent, such as hydroxyl, carboxyl, the sulfo group, alkyl, amino, acyl-amino etc. Suitable acid-binding agents are, for instance, salts of acids, such as acetic acid or carbonic acid, or organic bases.

According to the present invention it is possible to prepare benzoquinones containing two amine radicals of different kind, for instance benzoquinones of the following general formula:

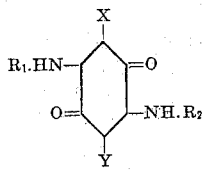

wherein X and Y represent members of the group consisting of hydrogen, halogen and methyl and $R_1$ and $R_2$ represent members of the group consisting of hydrogen, alkyl and aryl, $R_1$, however, being different from $R_2$.

It is also possible to perform the above-characterized process by condensing 2 mols of an amino-alkoxy-1.4-benzoquinone derivative with 1 mol of a diamine, products of high molecular weight being then formed. The reactions which occur, for instance when alkyl ethers and amines are used, may be illustrated by the following formulae:

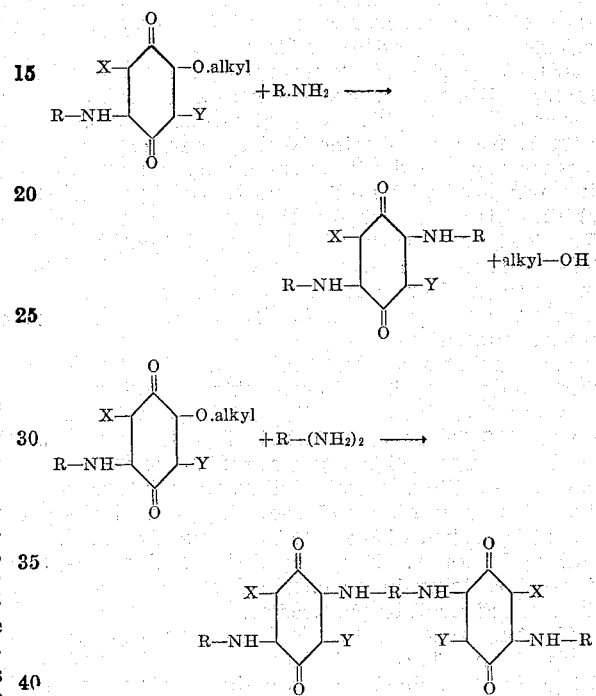

wherein X and Y represent members of the group consisting of hydrogen, halogen, alkyl and aryl, R being hydrogen, alkyl or aryl containing any substituents.

The products obtainable by the process of the present invention may be sulfonated in known manner.

Since diamino - 1.4 - benzoquinone derivatives are useful as vat-dyestuffs for wool, the products of the invention form a valuable addition to this class of dyestuffs, especially with respect to the shade of the dyestuffs. As far as the new products contain groups which lend solubility and form complexes, they are suitable for printing cotton mordanted with metal salts. The new products are also valuable intermediate products for the manufacture of, for instance, sulfur- and dioxazine-dyestuffs. (Patent application Ser. No. 242,920 for "Dioxazine dyestuffs and a process of preparing them" filed in the name of Greune et al.)

The following examples serve to illustrate the invention, but they are not intended to limit it thereto; the parts are by weight:

(1) 29.8 parts of 2 - methoxy - 5 - anilino-3.6-dichloro-1.4-benzoquinone, 450 parts of alcohol and 20 parts of ammonia of 25 per cent strength are heated together to boiling for one hour. The mixture is filtered with suction and the solid product obtained is washed with alcohol. The 2-amino - 5-anilino-3.6-dichloro-1.4-benzoquinone, which crystallizes in the form of greenish-brown needles, dissolves in dilute caustic soda solution to a brown solution and forms a colorless vat.

A similar body is obtained by using, instead of ammonia, 25 parts of an alcoholic ethylamine solution of 50 per cent strength.

(2) 29.8 parts of 2 - methoxy - 5 - anilino-3.6-dichloro-1.4-benzoquinone are heated to boiling, for one hour, in 450 parts of alcohol together with 17 parts of para-amino-diphenyl and 10 parts of sodium acetate. The mixture is filtered with suction, while hot, and the solid product obtained is washed with alcohol and water and dried. The 2-(para-diphenyl)-amino-5-anilino-3.6-dichloro-1.4-benzoquinone is obtained in the form of light-brown needles and dyes wool in a colorless vat yellow-brown tints.

(3) 40 parts of 2-ethoxy-5-anilino-3.6-dibromo-1.4-benzoquinone are heated to boiling, for one hour, in 450 parts of alcohol together with 21 parts of 3-amino-N-ethyl-carbazole and 6 parts of calcined sodium carbonate. The mixture is filtered with suction and the solid product obtained is then washed with alcohol and water. The 2-(N-ethyl-carbazolyl-3'-amino)-5-anilino-3.6-dibromo-1.4-benzoquinone which is obtained in the form of small brown needles dyes wool, in a colorless vat having a feebly reddish fluorescence, brown tints.

(4) A mixture of 27.8 parts of methoxy-anilino-chloro-toluquinone, obtainable according to Example 3 of the above-cited application Serial No. 242,918, 300 parts of alcohol, 15 parts of beta-naphthylamine and 10 parts of sodium acetate is heated to boiling. After cooling, the mixture is filtered with suction and the solid product obtained is washed with a small amount of alcohol and with water. The $\beta$-naphthyl-amino-anilino-chloro-toluquinone obtained crystallizes in the form of small brown needles.

(5) An exactly neutralized solution of 17.3 parts of sulfanilic acid in 50 parts of water and 5.3 parts of calcined sodium carbonate is added to 37.4 parts of 2-methoxy-5-(para-diphenyl)-amino - 3.6 - dichloro - 1.4 - benzoquinone in 450 parts of alcohol and the whole is heated to boiling, after addition of 10 parts of sodium acetate, for one hour while stirring. The mixture is then filtered with suction, while hot, and the solid product obtained is washed with alcohol and water.

The mono-sulfonic acid obtained forms small light-grey needles; it dissolves in dilute sodium carbonate solution to a yellow-brown solution.

(6) 37.4 parts of 2 - methoxy - 5 - (para-diphenyl) - amino - 3.6-dichloro-1.4-benzoquinone, together with 500 parts of alcohol, 20 parts of $\beta$-anthramine and 11 parts of potassium acetate are heated to boiling for one hour, while stirring. The mixture is filtered with suction while hot and the solid product obtained is washed with alcohol and water. The dark-brown 2-($\beta$-anthramino) - 5 - (para - diphenyl) -amino-3.6-dichloro-1.4-benzoquinone dyes wool, in a yellowish vat, brown tints.

(7) A mixture of 36.2 parts of 2-ethoxy-5-($\beta$-naphthylamino) - 3.6 - dichloro-1.4-benzoquinone, 500 parts of alcohol, 22 parts of 3-aminopyrene and 10 parts of sodium acetate is heated to boiling for one hour. The dark-brown 2-(3'-pyrenylamino) - 5 - ($\beta$ - naphthylamino)-3.6-dichloro-1.4-benzoquinone obtained dyes wool in a yellow vat brown tints.

(8) A mixture of 37.4 parts of 2-methoxy-5-(para-diphenyl)-amino-3.6-dicholoro-1.4-benzoquinone, 1000 parts of n-butanol, 23 parts of $\beta$-amino-anthraquinone and 10 parts of sodium acetate is heated to boiling, while stirring, for 5 hours. The mixture is filtered with suction, while hot, and the solid product obtained is washed with alcohol and water. The yellow-brown 2 - ($\beta$-anthraquinonylamino) -5-(para-diphenyl) - amino - 3.6-dichloro-1.4-benzoquinone obtained dyes wool, in a yellow-red vat, yellow-brown tints.

(9) A mixture of 37.4 parts of 2-methoxy-5-(para-diphenyl) - amino-3.6-dichloro-1.4-benzoquinone, 500 parts of alcohol, 33.6 parts of 5-(3'-amino - benzoylamino)-3-sulfo-2-hydroxy-benzoic acid, 200 parts of water and 35 parts of sodium acetate is heated to boiling, while stirring, for 2 hours. The solid yellow-brown condensation product is filtered with suction, while hot, and washed with alcohol. It dissolves in water to a yellow-brown solution.

(10) A mixture of 45.7 parts of 2-n-butoxy-5-(N-ethyl-carbazolyl-3'-amino)-3.6-dichloro-1.4-benzoquinone, 1000 parts of alcohol, a solution of 27 parts of 5 - amino - 3-sulfo-2-hydroxybenzoic acid neutralized by means of sodium carbonate and 10 parts of sodium acetate is heated to boiling, while stirring for one hour. The solid brown condensation product is filtered with suction while hot, and washed with alcohol. It dissolves in water to a brown solution and dyes chromed cotton currant tints. It has the following probable constitution:

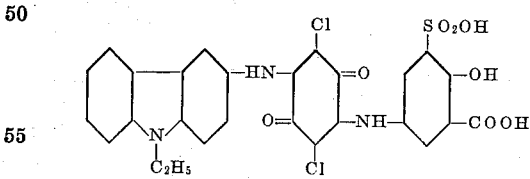

(11) A mixture of 45.7 parts of 2-n-butoxy-5-(N-ethyl-carbazolyl-3'-amino)-3:6-dichloro-1.4-benzoquinone, 1000 parts of alcohol, 22 parts of 3-aminopyrene and 10 parts of sodium acetate is heated to boiling, for 2 hours, the mixture is filtered with suction and the solid product obtained is washed with alcohol and water. The dark-brown product obtained dyes wool, in a yellow vat, brown tints.

(12) A mixture of 37.4 parts of 2-methoxy-5-(para-diphenyl)-amino-3.6-dichloro-1.4 - benzoquinone, 500 parts of alcohol, 15 parts of phenylene-diamine and 10 parts of sodium acetate is heated to boiling for one hour, while stirring, the mixture is filtered with suction, while hot, and the solid product obtained is washed with alcohol and water. The red-brown 2-(para - amino-anilino)-5-(para-diphenyl)-amino-3.6-dichloro-1.4-benzoquinone obtained dyes wool, in a colorless vat, red-brown tints.

(13) A mixture of 37.4 parts of 2-methoxy-5-(para - diphenyl) - amino-3.6-dichloro-1.4-benzoquinone, 1000 parts of n-butanol, 4.5 parts of para-phenylene-diamine and 8.5 parts of sodium acetate is heated to boiling for 4 hours. The mixture is filtered with suction, while hot, and the solid product obtained is washed with butanol, alcohol and water. The brown diaryl-amino-1.4-benzoquinone containing two quinone nuclei dyes wool in a colorless vat intense black-brown tints. It has the following probable constitution:

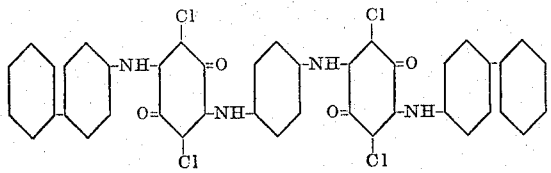

(14) A mixture of 37.4 parts of 2-methoxy-5-(para-diphenyl)-amino-3.6-dichloro-1.4 - benzoquinone, 1000 parts of glacial acetic acid, 9.2 parts of benzidine, and 8.5 parts of sodium acetate is heated to boiling for 2 hours. The mixture is filtered with suction, while hot, and the solid product obtained is washed. The brown diarylamino - 1.4 - benzoquinone containing two quinone nuclei dyes wool, in a colorless vat, yellow-brown tints.

(15) 45.7 parts of 2-n-butoxy-5-(N-ethyl-carbazolyl-3'-amino)-3.6-dichloro-1.4-benzoquinone are suspended in 500 parts of alcohol. A hot solution of 25 parts of 6-amino-2.3-hydroxynaphthoic acid and 30 parts of sodium acetate in 500 parts of alcohol and 50 parts of water is then run in, while stirring. The mixture is then heated to boiling for 2 hours, filtered with suction after cooling and the solid product obtained is washed with alcohol and water.

The dark-brown condensation product thus obtained dissolves only with difficulty in a dilute sodium carbonate solution. It has probably the following constitution:

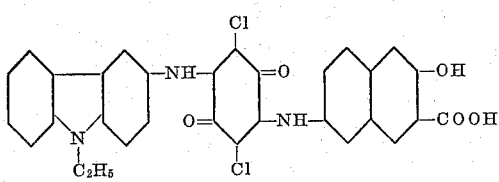

In an ammoniacal solution, it is easily transformed into a feebly yellow vat from which it dyes wool currant tints.

A similar product is obtained by condensing, in the same manner, 2-ethoxy-5-(beta-naphthylamino)-3.6-dichloro-1.4-benzoquinone.

(16) A mixture of 35.8 parts of 2-methoxy-5-(4'-hydroxy-3'-carboxy-anilino)-3.6 - dichloro-1.4-benzoquinone, 22 parts of 3-amino-pyrene, 10 parts of sodium acetate and 750 parts of alcohol is heated to boiling for one hour. The mixture is then filtered with suction and the solid product obtained is washed with alcohol and water.

The brown condensation product thus obtained, which is nearly insoluble in water, easily yields in ammonia a yellow vat, from which it dyes wool brown tints.

I claim:
1. The process which comprises heating a compound of the general formula:

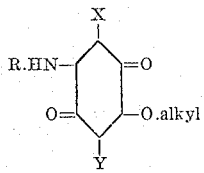

wherein X and Y represent members of the group consisting of hydrogen, halogen and methyl and R represents a member of the group consisting of hydrogen, alkyl and aryl, with a compound of the group consisting of ammonia and primary amines in the presence of a diluent.

2. The process which comprises heating a compound of the general formula:

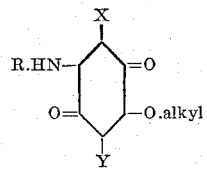

wherein X and Y represent members of the group consisting of hydrogen, halogen and methyl and R represents a member of the group consisting of hydrogen, alkyl and aryl, with a primary amine in the presence of a diluent.

3. The process which comprises heating a compound of the general formula:

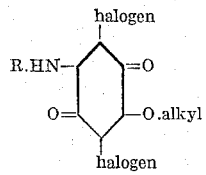

wherein R represents a member of the group consisting of hydrogen, alkyl and aryl, with a primary amine in the presence of a diluent.

4. The process which comprises boiling for about one hour 2-n-butoxy-5-(N-ethyl-carbazolyl - 3'-amino)-3.6-dichloro-1.4-benzoquinone with sodium 5-amino-3-sulfo-2-hydroxy-benzoate in the presence of ethyl alcohol and sodium acetate.

5. The process which comprises boiling for about four hours 2-methoxy-5-(para-diphenyl)-amino-3.6-dichloro-1.4-benzoquinone with para-phenylene-diamine in the presence of n-butanol and sodium acetate.

6. The process which comprises boiling for about two hours 2-n-butoxy-5-(N-ethyl-carbazolyl - 3' - amino)-3.6-dichloro-1.4-benzoquinone with 6-amino-2-hydroxy-6-naphthoic acid in the presence of ethyl alcohol, water and sodium acetate.

7. The compound of the formula:

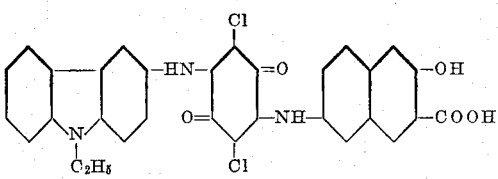

being a dark-brown product which dyes wool in a feebly yellow vat currant tints.

GERHARD LANGBEIN.